M. A. BROWN.
AUTOMATIC AIR BRAKE COUPLING OR CONNECTOR.
APPLICATION FILED APR. 27, 1912.
1,070,110.
Patented Aug. 12, 1913.
2 SHEETS—SHEET 2.
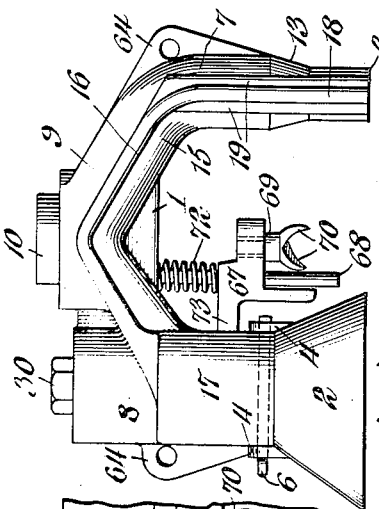
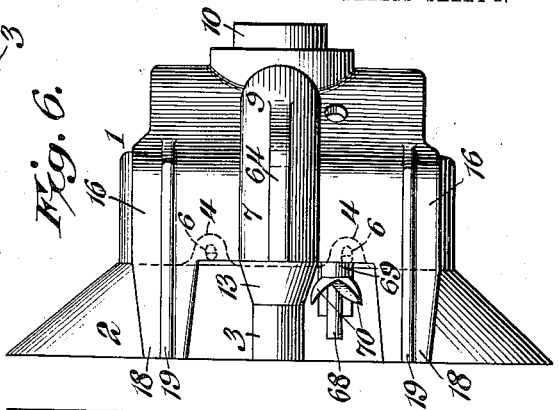
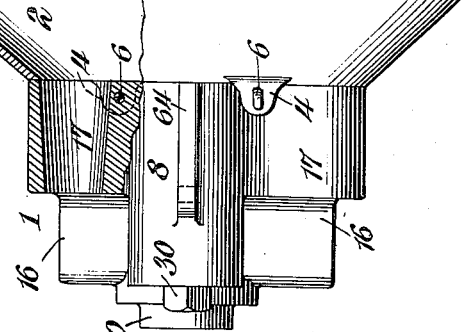
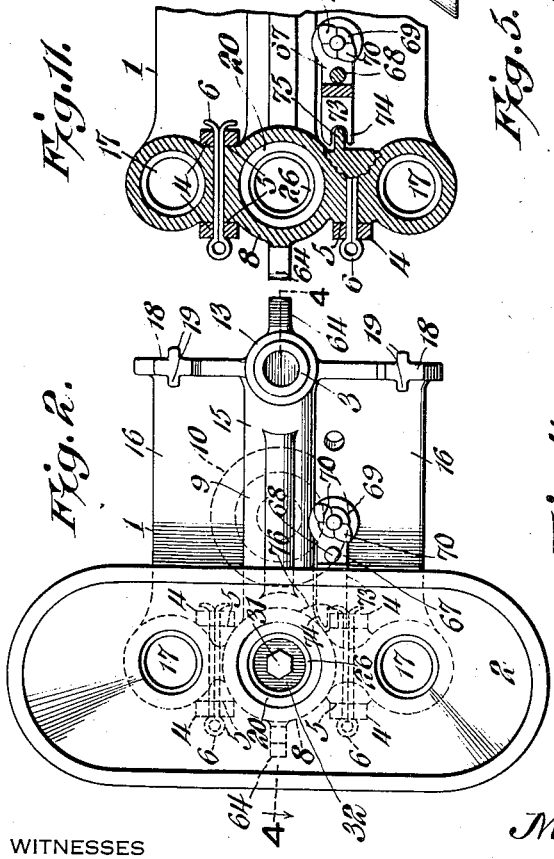
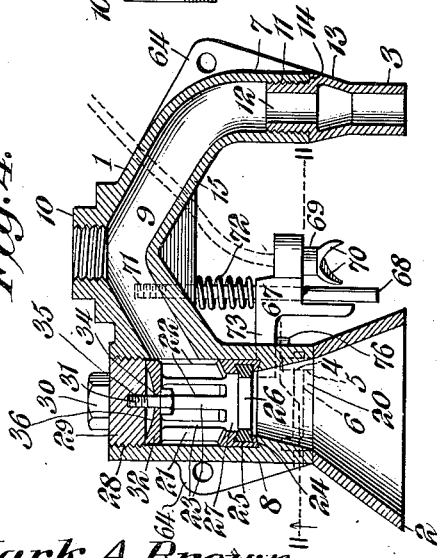
WITNESSES
Howard D. Orr
Mark A. Brown, INVENTOR,
BY
ATTORNEY One or more of the individual text elements may have minor OCR ambiguities.

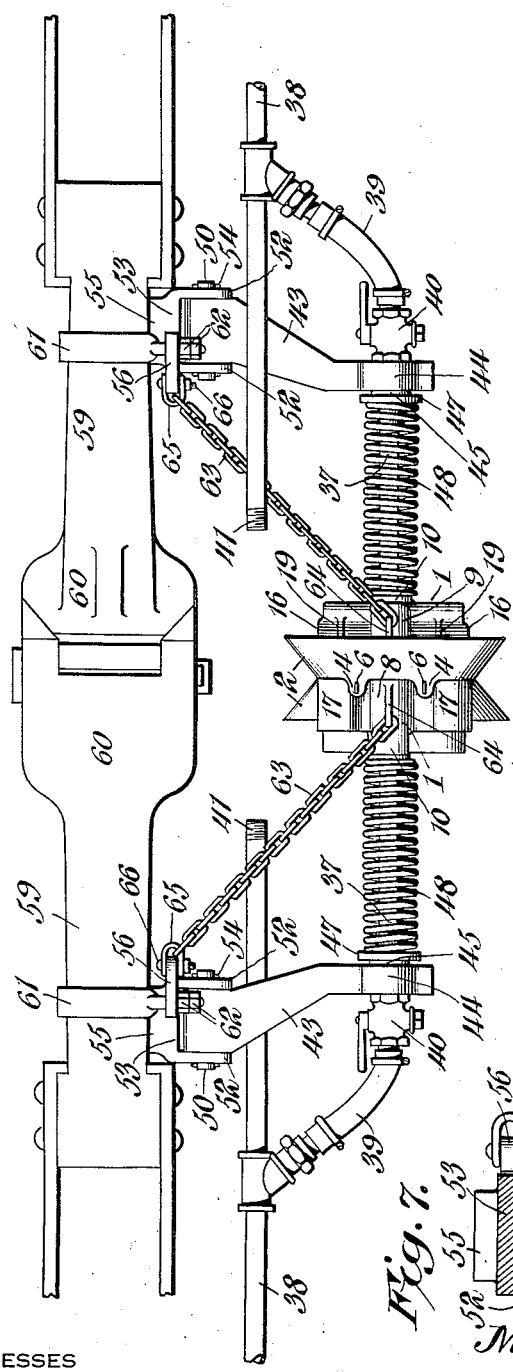

UNITED STATES PATENT OFFICE.

MARK A. BROWN, OF CHATTANOOGA, TENNESSEE, ASSIGNOR TO JAMES A. TATE, OF SHELBYVILLE, TENNESSEE.

AUTOMATIC AIR-BRAKE COUPLING OR CONNECTOR.

1,070,110.  Specification of Letters Patent.  Patented Aug. 12, 1913.

Application filed April 27, 1912. Serial No. 693,590.

*To all whom it may concern:*

Be it known that I, MARK A. BROWN, a citizen of the United States, residing at Chattanooga, in the county of Hamilton and State of Tennessee, have invented a new and useful Automatic Air-Brake Coupling or Connector, of which the following is a specification.

The invention relates to an automatic interchangeable air brake coupling or connector.

The object of the present invention is to improve the construction of the air brake couplings or connectors, forming the subject-matter of an application filed by me on or about Apr. 6, 1910, Serial No. 553.736, and Patent No. 1,012,514, granted to me Dec. 19, 1911, and to provide a simple, efficient and comparatively inexpensive automatic air brake coupling, designed for use on freight cars and equipped with a single air passage for connection with the brake pipe of a train, and capable of coupling with similar couplings or connectors of freight car equipments, and also with the couplings or connectors of passenger car equipments where a plurality of passages, either three or more, is provided for the brake, signal, steam, or other pipes of a train.

A further object of the invention is to lessen the cost of manufacture and the up-keep of the equipment by enabling the coupling head to be constructed of a plurality of separate castings or pieces, which may be readily assembled and easily replaced, when broken, by new parts without discarding the entire coupling head.

Another object of the invention is to enable the elastic gasket of the coupling head to be readily removed and replaced by a new gasket with an ordinary wrench without the necessity of uncoupling the cars and without the employment of a special tool or tools.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a side elevation of a freight car air brake coupling or connector, constructed in accordance with this invention. Fig. 2 is an enlarged front elevation of one of the members of the air brake coupling. Fig. 3 is a plan view of the same. Fig. 4 is a horizontal sectional view on the line 4—4 of Fig. 2. Fig. 5 is a side elevation partly in section. Fig. 6 is a side elevation showing the opposite side of the air brake coupling. Fig. 7 is a vertical longitudinal sectional view of the rear portion of the air brake coupling. Fig. 8 is a detail view of the swinging bracket. Figs. 9 and 10 are detail views of the bearing bracket or support. Fig. 11 is a detail transverse sectional view on the line 11—11 of Fig. 4.

Like numerals of reference designate corresponding parts in all the figures of the drawings.

In the accompanying drawings in which is illustrated the preferred embodiment of the invention, the body portion 1 of the coupling head, the oblong flaring funnel or bell-shaped shell 2 and the tubular point or nozzle 3 preferably consist of three separate castings or pieces to lessen their cost of manufacture and to enable either the shell 2 or the tubular point or nozzle 3 to be easily replaced by a new part without discarding the body of the coupling head, should they become broken or otherwise injured. The tubular shell 2, which fits against the front of the body portion 1 at one side thereof, is provided at its inner edge with attaching lugs 4, arranged in pairs and spaced apart to receive the adjacent side of the body portion 1 between them and fitting against flat side faces 5 thereof and secured to the same by transverse fastening devices consisting of keys or cotter pins 6, piercing the attaching lugs and the adjacent side of the coupling head. Instead of employing keys or cotter pins any other form of fastening device may of course be used for detachably securing the shell 2 to the body of the coupling head.

The coupling head, which is approximately U-shaped, is provided with a central air passage, composed of straight longitudinal side portions 7 and 8 and an inner or rear approximately V-shaped transverse connecting portion 9, having angularly related sides converging rearwardly and meeting at and communicating with a nipple 10. The straight longitudinal side portion 7 of the air passage is provided at the outer end with interior screw threads 11 to receive a reduced inner exteriorly threaded portion 12 of the tubular point or nozzle 3, which is centrally expanded at 13 to form an intermediate enlargement and provide a shoulder 14 to abut against the adjacent side of the body portion of the coupling head. The intermediate enlargement tapers outwardly from the shoulder 14, as clearly shown in Fig. 4 of the drawings. The threaded connection of the tubular point or nozzle enables the latter to be readily applied to and removed from the body portion of the coupling head, and the said nozzle is preferably constructed of brass, or other suitable material, which will prevent rusting of the parts, so that rust will not interfere with the removal of the threaded nozzle. The outer portion of the detachable nozzle is cylindrical beyond the enlarged intermediate tapered portion.

The body of the coupling head consists of a horizontal tubular central portion 15 and upper and lower webs or flanges 16, and it is provided at one side with upper and lower circular openings or sockets 17 and at the opposite side with integral solid projecting dummy guiding points 18, located above and below the horizontal projecting tubular point or nozzle 3 and tapered toward their outer ends and adapted to fit in the openings or sockets 17 of a similar coupling head, or in the upper and lower openings or passages of the coupling head of a passenger equipment. The upper and lower openings or sockets 17 are adapted to receive the tapered upper and lower points 18 and also the upper and lower tubular points or nozzles of the coupling head of the passenger equipment. By this construction and arrangement, freight cars equipped with the air brake coupling of the present invention are adapted to be coupled with passenger cars, provided with corresponding air brake couplings having a plurality of passages for connection with the air brake, signal and steam pipes of a train. The upper and lower solid projecting points each consist of a narrow body portion and projecting side flanges 19, but they may be of any other preferred form to fit the sockets or openings 17, or the upper and lower passages of another air brake coupling.

The side portion 8 of the air passage has a flared front end or entrance 20, and it is counter-bored from the rear of the body of the coupling head to receive a metallic gasket carrying sleeve or member 21, constructed of brass or other material, which will not rust, and it is provided with an annular series of longitudinal openings 22, formed by narrow spaced longitudinal ribs 23 and adapted to afford ample space for the free passage of air to the inner transverse connecting portion 9 of the air passage. The front end of the sleeve fits a shoulder 24, formed by the counter-bore, and it is provided with an interior annular groove 25 for the reception of a gasket 26 of rubber, or other suitable material. The groove 25 is tapered in cross section, and its walls converge toward the inner face of the sleeve and are adapted to retain the gasket 26 securely in the groove. The gasket 26, which is tapered in cross section to conform to the configuration of the groove, may be readily pressed into the same, and it is of sufficient thickness to project inwardly from the inner face of the sleeve or member, which is provided in rear of the gasket with a metallic bearing face 27 to form with the tubular point or nozzle 3 of a companion coupling head a ground metallic joint. The outer portion of the tubular point or nozzle 3 is cylindrical and is adapted to extend into the gasket carrying sleeve, the intermediate tapered portion 13 being adapted to enter the air passage and project into the front portion of the gasket carrying sleeve or member sufficiently to make an air tight joint or connection. When the tapered portion of the tubular point or nozzle enters the air passage 8 of a companion coupling head, it moves across the bearing face of the elastic gasket and wipes the same and is adapted to remove therefrom cinders or any other accumulation. This insures a clean air tight joint and prevents dust, cinders, and the like from producing a leakage in the coupling.

The rear end of the counter-bore of the side portion 8 of the passage is provided with interior screw threads 28, which are adapted to be engaged by threads of a screw plug 29, constructed of brass or other suitable material, which will not rust, and having a polygonal wrench receiving head 30 and connected with the gasket carrying sleeve by a screw 31. The gasket carrying sleeve is provided with a rear end wall 32, which is pierced by the screw 31, having its head arranged at the inner face of the end wall 32. The screw 31, which passes through a smooth central opening 34 in the end wall 32, engages a threaded socket 35 in the inner end of the screw plug 29, and it may be fixed in the socket by any suitable means, and it forms a swivel joint or connection between the screw plug and the gasket carrying sleeve. The end wall 32 presents a concave face 36 to the inner face of the threaded plug to reduce friction, and when the plug is turned to screw it into or out of the threaded portion of the passage 8, it carries with it the sleeve or member 21 and the gasket thereof. By this construction and arrangement, the gasket carrying sleeve with its gasket may be readily removed and replaced by an ordinary wrench when two cars are coupled without necessitating the uncoupling of the same.

The nipple 10 is interiorly threaded to receive one end of a horizontal pipe 37 constituting a shank or stem and connected at its rear or inner end with the brake pipe 38 by a piece of flexible hose 39, having a cock or valve 40 adapted to close the passage through the coupling head when an ordinary hose coupling (not shown) connects the end 41 of the brake pipe with the brake pipe of a car equipped with the ordinary train pipe coupling. The rear portion of the pipe 37 extends through an opening 42 of a laterally swinging suspension bracket 43, oppositely bowed at 44 at opposite sides of the opening 42 to receive a rounded enlargement 45 of a sleeve 46, arranged on the rear portion of the pipe 37 and having an annular flange 47 arranged in advance of the swinging bracket. The rounded enlargement 45, which is located at the inner or rear end of the sleeve 46, coöperates with the bowed or curved sides 44 of the swinging bracket to form a ball and socket joint or connection to permit free action of the parts. The coupling head is yieldably maintained in proper position for coupling and in proper engagement with the other member of the air brake coupling or connector by a coiled spring 48, surrounding the pipe 37 and having its outer or front terminal arranged on the nipple 10 and its rear end fitted on the sleeve 46 and bearing against the annular flange 47.

The suspension bracket, which supports the rear portion of the air brake coupling, consists of a short upper vertical portion, a downwardly and forwardly inclined intermediate portion and a lower vertical outer or front portion. The vertical top portion is provided with a central horizontal bearing opening 49 for the passage of a horizontal longitudinally disposed pivot pin 50, which is mounted in openings 51 of spaced depending bearing lugs 52 of a bearing bracket 53. The pivot pin 50 is preferably retained in the bearing openings 51 of the lugs 52 by means of keys 54, but any other suitable fastening means may be employed for this purpose. The bearing openings are inclined transversely, as clearly illustrated in Fig. 10 of the drawings, and their lower ends are centrally arranged, so that the suspension bracket hangs in a central position when the longitudinal pivot pin is at the lower ends of the openings 51. When the pivot pin is in this position, the suspension bracket has a limited lateral swing. The laterally inclined openings 51 permit the bearing bracket to be drawn or swung to one side with respect to the bearing bracket 53 and secured in such position out of the way of the ordinary train pipe coupling by any suitable means when it is necessary to couple a car equipped with the improved air brake coupling with one not provided with the same. The inclined bearing openings are adapted, through the action of gravity, when the suspension bracket is released to cause the same and its pivot to assume a central position.

The bearing bracket or support 53, which is constructed of suitable metal, consists of a flat horizontal plate, provided at its upper face with parallel longitudinal ribs or flanges 55, and having projecting ears 56, located at opposite sides of the bearing bracket and extending laterally and forwardly therefrom and provided with front and rear perforations 57 and 58. The ribs or flanges 55 are adapted to fit against the lower face of the shank 59 of a car coupler 60, and they space the plate or body portion from the shank 59. The inner or rear perforations 58 are adapted to receive lower threaded portions of the sides of a U-bolt 61, having flat upper side portions and a flat top connecting portion fitting the top and sides of the shank 59 of the car coupling. The lower threaded portions of the U-bolt 61 receive nuts 62, preferably arranged in pairs to secure a locking action.

The air brake coupling when uncoupled is supported in a horizontal position by chains 63 or equivalent flexible connections, which slacken when the air brake coupling is connected with a companion coupling, the slack being sufficient to permit a free movement of the air brake coupling in any direction without liability of straining or impairing the air tight union or joint between the couplings. The chains 63, which extend downwardly and forwardly from the bearing bracket or support, are provided at their lower ends with links, which are linked into perforations of lugs 64, extending laterally from opposite sides of the coupling head and arranged centrally thereof with respect to the top and bottom of the same. The upper ends of the chains are connected by clevices 65 with the bearing bracket. The clevices, which are approximately U-shaped, embrace the front portions of the projecting ears or flanges 56 and are secured to the same by vertical bolts 66, passing through the sides of the clevices and through the front or outer perforations 57 of the laterally extending horizontally disposed ears or flanges 56. In some draft riggings where it is not convenient to connect the chains with the laterally projecting ears or flanges of the bearing bracket or support, the upper ends of the chains may be connected by any suitable means with the shank of the draw bar at a convenient point along the same. The coupling head may also be equipped with means for connecting lighting and other circuits of a train, and such means preferably consists of a slide or support 67, mounted on a horizontal guide rod 68 and carrying an electrical contact 69, having diverging gathering arms 70, arranged to engage with similar guiding or gathering arms of a corresponding electrical contact. The rod 68, which is located at the space between the sides of the coupling head, has a threaded inner portion 71, secured in a threaded opening or socket in the body of the coupling head. The rod 68 also supports a coiled spring 72, interposed between the coupling head and the slidable support and urging the latter outwardly to maintain the electrical contact in yieldable engagement with the electrical contact of a corresponding coupling head. The electrical contact 69 is located at one side of the rod, and the slidable support is provided at the opposite side of the rod 68 with a laterally projecting arm 73, having a forked terminal portion 74, slidably interlocked with a horizontal guiding rib 75 of the body portion of the coupling head. The rib 75 is located in rear of the flaring funnel, and the body of the coupling head is provided at the outer end of the coupling head with a shoulder 76, which limits the forward or outward movement of the slidable support.

No claim is made in the present case to the means for coupling the electrical conductors.

What is claimed is:—

1. An air brake coupling including a coupling head having a central air passage and provided at one side thereof with a projecting nozzle and having upper and lower projecting dummy points located above and below the nozzle, said air brake coupling being also provided at the opposite side with openings or sockets located above and below the air passage.

2. An air brake coupling including a coupling head having an air passage consisting of opposite side portions and a connecting transverse portion, said coupling head being provided at one side of the passage with upper and lower openings or sockets and having at the other side of the passage a tubular projecting nozzle, said coupling head being also provided above the nozzle with projecting dummy points adapted to enter the upper and lower openings or sockets of a companion coupling head.

3. An air brake coupling including a coupling head having an air passage consisting of opposite side portions and a connecting transverse portion, said coupling head being provided at one side of the passage with upper and lower openings or sockets and having at the other side of the passage a tubular projecting nozzle, said coupling head being also provided above and below the nozzle with integral projecting dummy guiding points having longitudinal flanges and tapered outwardly and adapted to extend into the upper and lower openings or sockets of a companion coupling head.

4. An air brake coupling including a coupling head provided with an air passage composed of opposite side portions and a transverse connecting portion, said coupling head comprising a body portion interiorly threaded at one of the side portions of the air passage and provided at the other side portion of the air passage with a flaring shell, and a projecting detachable nozzle consisting of a cylindrical outer portion, a threaded inner portion extending into the threaded portion of the air passage and engaging the threads thereof, and an enlarged intermediate outwardly tapered portion forming an exterior shoulder to fit against the coupling head and adapted to extend into and engage the walls of the passage of a companion coupling at the shell thereof to make a tight joint.

5. An air brake coupling including a coupling head provided at one side with a projecting nozzle and having an opening at the opposite side provided with interior screw threads, a gasket carrying member removably mounted in the said opening, a gasket carried by the said member and held by the same in the opening of the said coupling head, a screw plug engaging the thread of the opening, and means for connecting the screw plug with the gasket carrying member, whereby the latter will be carried by the former in applying it to and removing it from the coupling head.

6. An air brake coupling including a coupling head provided at one side with a projecting nozzle and having an opening at the other side extending through the coupling head and provided at the back with screw threads, a sleeve removably arranged in the opening of the coupling head, a gasket carried by the sleeve, and a screw plug engaging the threads of said opening and connected with the sleeve.

7. An air brake coupling including a coupling head provided at one side with a projecting nozzle and having an opening at the opposite side extending through the rear portion of the coupling head and provided with interior screw threads, a gasket carrying sleeve open at its outer end and provided at the side with an opening and having an inner or rear end wall, a gasket carried by the said sleeve, a screw plug engaging the threads of the said opening, and a fastening device piercing the said end wall of the sleeve and securing the latter to the screw plug, whereby the sleeve will be carried by the plug in applying it to and removing it from the coupling head.

8. An air brake coupling including a suspension bracket, a pivot for the same, and a bearing bracket provided with spaced portions having alined inclined bearing openings receiving the pivot and permitting the bracket and the pivot to be moved to one side and adapted to centrally seat the same automatically when the bracket is released.

9. An air brake coupling including a bearing bracket provided with spaced depending bearing lugs having longitudinally alined bearing openings arranged at an inclination, and a laterally swinging suspension bracket having a pivot arranged in the said bearing openings to permit the bracket to have both a pivotal movement, said inclined openings also permitting the bracket to be moved bodily to one side and adapted to centrally seat the pivot of the bracket automatically when the said bracket is released.

10. An air brake coupling including a bearing bracket consisting of a plate having depending bearings and provided at opposite sides with forwardly projecting horizontal flanges having front and rear perforations, the rear perforations being adapted to receive fastening means for securing the bracket to the shank of a car coupling, a suspension bracket pivotally hung from the bearing bracket, a pipe connected with the coupling head and supported by the suspension bracket, and flexible connections secured to the coupling head at opposite sides thereof and having fastening means arranged in the front perforations of the said flanges.

In testimony, that I claim the foregoing as my own, I have hereto affixed my signature in the presence of two witnesses.

MARK A. BROWN.

Witnesses:
JOHN A. CHAMBLIES,
STEPHEN R. RODDY.